United States Patent
Miyanoshita et al.

(12) 
(10) Patent No.: US 6,290,842 B1
(45) Date of Patent: Sep. 18, 2001

(54) COAGULATOR

(75) Inventors: Tomoaki Miyanoshita; Hisaaki Ochiai, both of Tokyo (JP)

(73) Assignee: Organo Corporation, Tokyo (JP)

( * ) Notice: Subject to any disclaimer, the term of this patent is extended or adjusted under 35 U.S.C. 154(b) by 0 days.

(21) Appl. No.: 09/462,514

(22) PCT Filed: Apr. 30, 1999

(86) PCT No.: PCT/JP99/02322

§ 371 Date: Jan. 6, 2000

§ 102(e) Date: Jan. 6, 2000

(87) PCT Pub. No.: WO99/58456

PCT Pub. Date: Nov. 18, 1999

(30) Foreign Application Priority Data

May 8, 1998 (JP) .................................................. 10-125825

(51) Int. Cl.[7] .................................................. B01D 24/00
(52) U.S. Cl. .............................. 210/97; 210/86; 210/264; 210/265; 210/284; 210/313; 210/317; 210/536; 210/DIG. 5
(58) Field of Search ............................... 210/86, 97, 104, 210/112, 264, 265, 266, 268, 305, 311, 312, 313, 532.1, 533, 536, 702, 709, 715, DIG. 5, 207, 274, 284, 283, 317

(56) References Cited

U.S. PATENT DOCUMENTS

| | | |
|---|---|---|
| 4,049,549 | * 9/1977 | Moore . |
| 4,178,243 | 12/1979 | Messer . |
| 5,252,231 | 10/1993 | Capdeville . |
| 5,589,064 | 12/1996 | Elmaleh . |

FOREIGN PATENT DOCUMENTS

| | | |
|---|---|---|
| 2 158 290 | 6/1973 | (DE) . |
| 0 025 309 A1 | 3/1981 | (EP) . |
| 0 417 367 A1 | 3/1991 | (EP) . |
| 44-20029 | * 8/1969 | (JP) . |
| 2-284604 A | * 11/1990 | (JP) . |
| WO 91/18658 | 12/1991 | (WO) . |

OTHER PUBLICATIONS

Patent Abstracts of Japan, Publication No. 06304411, Publication Date Jan. 11, 1994.
Patent Abstracts of Japan, Publication No. 02237604, Publication Date Sep. 20, 1990.
Patent Abstracts of Japan, Publication No. 55005744, Publication Date Jan. 16, 1980.

* cited by examiner

*Primary Examiner*—Joseph W. Drodge
*Assistant Examiner*—Terry K. Cecil
(74) *Attorney, Agent, or Firm*—Rosenthal & Osha L.L.P.

(57) ABSTRACT

A front packing medium accumulation layer (90) and a downstream packing medium accumulation layer (44) which are separated by a lower outflow prevention plate (40) are arranged within a coagulation tank (80). The superficial water passage velocity within the front packing medium accumulation layer (90) is so set as to be larger than the downstream packing medium accumulation layer (44). A floc drawoff pipe (98) is provided for drawoff flocs over the lower outflow prevention plate (40). The interface between a floc blanket which may be formed between the lower outflow preventing plate (40) and the upper packing medium accumulation layer (44) and water thereabove is detected by an interface meter (100) so that a flow regulating valve (102) is correspondingly controlled to regulate the flow rate of the flocs. This prevents any grown floc blanket from reaching the downstream packing medium accumulation layer (44). Thereby extending the cleaning interval.

14 Claims, 6 Drawing Sheets

COAGULATOR

BACKGROUND OF THE INVENTION

1. Technical Field

The present invention relates generally to a coagulator in which a coagulant is mixed into raw water, and suspended solids in the raw water are settled in a coagulated manner for separation in a coagulation tank, and more particularly to a coagulator having a packing medium accumulation layer(s) within the coagulation tank.

2. Background Art

Coagulators are known as water treatment apparatuses for use in cases where river water or the like, as raw water, is subjected to water treatment to obtain city water or industrial water, or where drainage such as public sewage and factory waste water is treated to meet regulatory limits. Among them, frequently employed is a so-called upward flow type coagulator, in particular, one having a packing medium accumulation layer in the interior of the coagulation tank because, for example, it has higher coagulating and filtering efficiencies and is easy to operate.

In such an upward flow type coagulator, a coagulant is first mixed into raw water. Raw water bearing the coagulant is then passed through the interior of the coagulation tank with upward flow to coagulatively separate flocculated flocs. In particular, within the coagulation tank there is provided a packing medium accumulation layer consisting of small pieces of packing medium with a large void ratio, through which the raw water bearing the coagulant flows with upward flow to thereby effectively flocculate and settle the suspended solids in the raw water.

Figure 5:
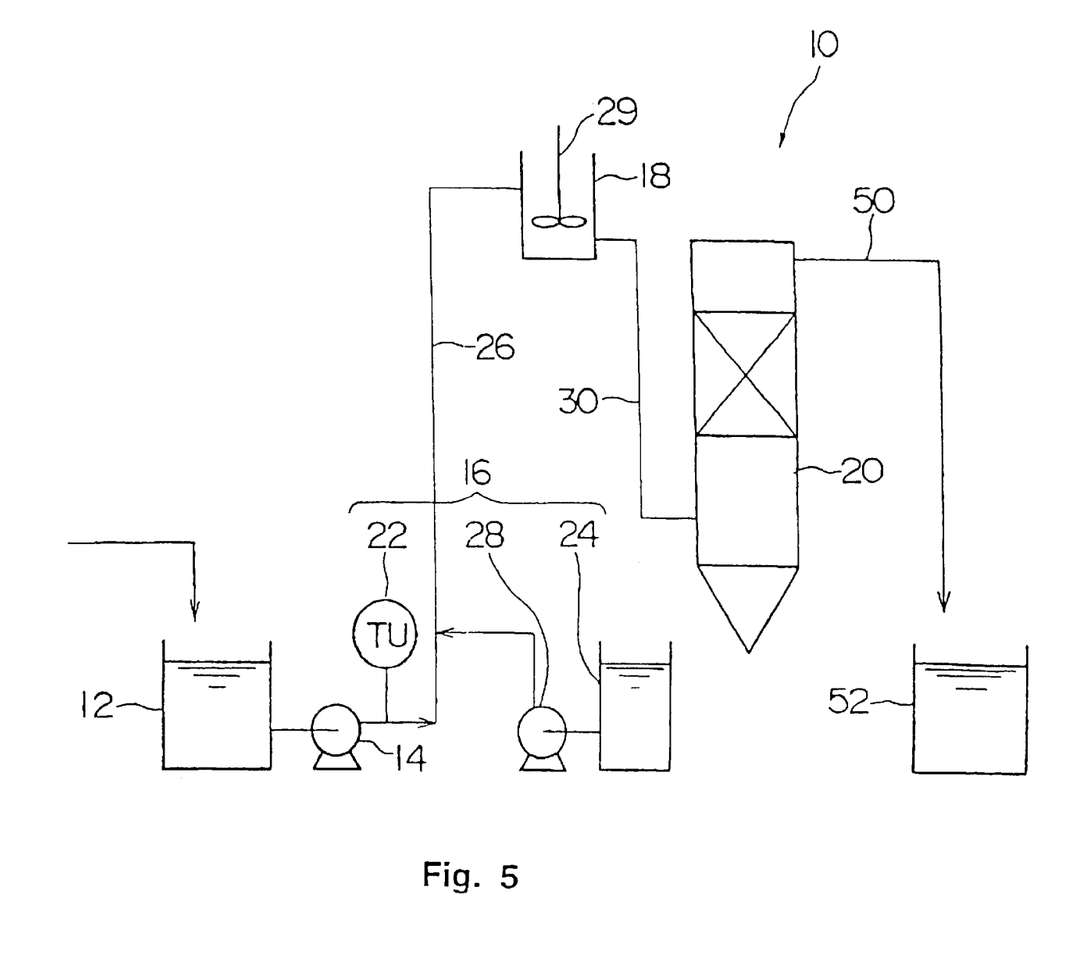
FIG. 5 is a schematic diagram showing the construction of the coagulation tank of the conventional coagulator.
Figure 6:
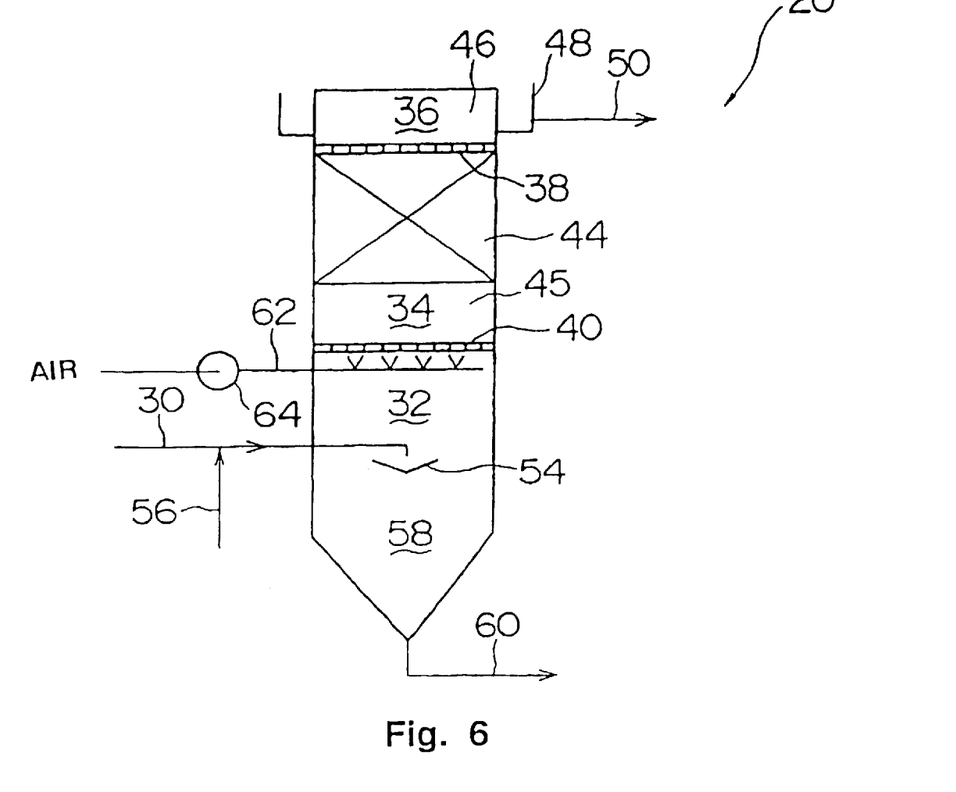
FIG. 6 is a schematic diagram showing the construction of the coagulation tank of the conventional coagulator.

Referring now to FIGS. 5 and 6, description will be given of a construction and an operation method of the conventional upward flow type coagulator. FIG. 5 is a flow sheet showing the construction of the conventional upward flow type coagulator, and FIG. 6 is a schematic diagram showing the construction of a coagulating tank.

The conventional upward flow type coagulator designated generally at 10 comprises, as shown in FIG. 5, a raw water tank 12, a raw water pump 14 for pumping raw water from the raw water tank 12 to feed the water, a coagulant dosing facilities 16, a coagulant mixing tank 18 and a coagulation tank 20.

The coagulant dosing facilities 16 includes a turbidimeter 22 for measuring the turbidity of the raw water, a coagulant tank 24, and a coagulant pump 28 for injecting the coagulant from the coagulant tank 24 into a raw water supply pipe 26 downstream of the turbidimeter 22 so that a desired amount of coagulant is added into the raw water on the basis of measured value of the turbidimeter 22.

The coagulant mixing tank 18 is a container fitted with a stirrer 29, in which the raw water bearing the coagulant temporarily stays and is stirred by the stirrer 29 to rapidly mix the raw water and the coagulant. The raw water fully mixed with the coagulant is sent via an inflow pipe 30 to the coagulation tank 20.

The coagulation tank 20 is a tank in which coagulative flocs containing suspended solids which have been aggregated by the coagulant are flocculated and filtrated and separated. The coagulation tank 20 consists of a raw water inflow zone 32, a packing medium 34 and a water collection zone 36 which are partitioned in sequence from below as shown in FIG. 6.

Figure 7:
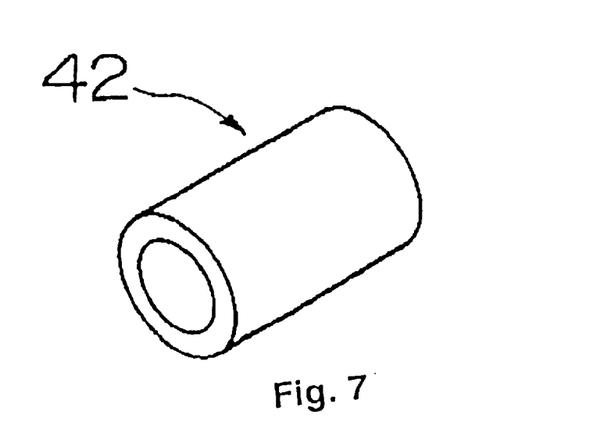
FIG. 7 is a perspective view of an example of a packing medium.

The packing medium zone 34 is partitioned by outflow prevention plates 38 and 40 which are porous mesh-like or perforated like partition plates provided in an upper part and lower part of the zone. In the region therebetween are accommodated a plurality of small packing medium with a large void ratio, e.g., plastic small packing medium 42 with a relatively small specific gravity in the shape of shortened tube as shown in FIG. 7.

Upon the passage of the raw water, the packing medium 42 is accumulated below the upper outflow prevention plate 38 with the upward flow of the raw water to form a packing medium accumulation layer 44, whereas a water flow region 45 is formed in between the packing medium accumulation layer 44 and the lower outflow prevention plate 40, with no or little substances except the flowing water.

The water collection zone 36 is a region for collecting the treated water which has been treated through the packing medium zone 34, the zone 36 consisting of a water collecting part 46 disposed immediately above the outflow prevention plate 38 of the packing medium zone 34, a water collection trough 48 for collecting treated water overflowing from the upper end of the water collection part 46, and an outflow pipe 50 connected to the water collection trough 48 for sending the treated water to the treated water tank 52 (see FIG. 5).

The raw water leaving the coagulant mixing tank 18 flows via the inflow pipe 30 into the inflow zone 32. The inflow pipe 30 which extends to the middle of the inflow zone 32, and has at its tip a downward opening. An inverted umbrella shaped baffle plate 54 is provided under the opening of the inflow pipe 30 for changing the direction of the downward flowing raw water to upward direction. An alkaline agent injection pipe 56 is also connected to the inflow pipe 30 so as to inject an alkaline solution, if desired, for the control of the pH of the raw water.

In the lower part of the inflow zone 32, that is, below the baffle plate 54, there lies a hopper shaped sludge storage zone 58 for storing the sludge, to whose lowermost part is connected a sludge discharge pipe 60 for discharging the sludge.

Above the inflow zone 32 is disposed an air supply pipe 62 having a plurality of air nozzles for jetting air upward, so as to eject air fed by the air blower 64 to thereby stir and cleanse the packing medium 42 of the packing medium accumulation zone 34.

In the coagulation tank 20 the raw water bearing the coagulant first flows into the inflow zone 32. First settled and separated in the inflow zone 32 are relatively large flocs among flocs formed as a result of coagulation of the suspended solids in the raw water.

The raw water then flows into the packing medium zone 34, in which micro flocs remaining in the raw water come into contact with the packing medium 42 and adhere onto the external surface of the packing medium and onto the inner surface of the packing medium or is captured in the interstices between the packing medium 42 and is separated from water. On the other hand, the raw water flows through voids of the packing medium 42 or flows through between the packing medium 42, and is filtrated through the floc layer formed in the voids or between the packing medium, while simultaneously micro flocs in the raw water are captured by the floc layer.

The flocs which have adhered onto the packing medium 42 or have been captured between the packing medium grow gradually due to contact with the subsequent micro flocs or the like, resulting in an increase of the floc diameter. Then, accordingly as the flocs having a higher settlement velocity than the upward flow rate of the raw water become formed, those flocs are dislodged from the packing medium 42 due to the flow of raw water and further settle against the flow of the raw water and are retained in the sludge storage zone 58, and then discharged from the sludge discharge pipe 60.

In this manner, the suspended solids in the raw water are separated from the raw water and settled in the sludge storage zone 58 due to the coagulation function of the suspended solid flocs, filtration function thereof for the raw water, and separation and settlement function of the floc. On the other hand, the raw water flows as the treated water from the upper water collection zone 36 into treated water tank 52.

This upward flow type coagulator enables a high speed treatment to be performed since the density of the coagulated flocs which have become thickly agglomerated is high with correspondingly higher settlement speed. Accordingly, the facilities become compact, resulting in a smaller facility area, with reduced dosages of chemical agents (coagulants, etc.), and with easy treatment and disposal of the generated sludge.

DISCLOSURE OF THE INVENTION

In the above-mentioned coagulation tank 20, however, upon the passage of raw water, there is formed a cylindrical part which contains little or no substances except the water, that is, a flow water region 45 between the packing medium accumulation layer 44 and the lower outflow prevention plate 40. The flow water region 45 is a region which needs not necessarily be formed from the standpoint of the raw water coagulating treatment, but an indispensable region as a space for fluidization of the packing medium 42 when the packing medium 42 is stirred and cleansed by air upon the clogging of the packing medium accumulation layer 44.

In the process of investigation of the above-mentioned coagulator, the present inventors have found out that depending on the raw water quality, in particular, when the turbidity of the raw water is high, a floc blanket which is an aggregate of the flocs is formed in the above-mentioned flow water region. As used in this description, the floc blanket refers to a blanket like aggregate of flocs floating in the flow water region, the flocs being formed by coagulation of the suspended solids in the raw water due to a coagulating effect of the coagulant. The formation of the floc blanket can be described as follows. That is, turbidities aggregated by the coagulant becomes much larger in the packing medium accumulation layer and tends to have a higher settlement speed than the upward water passage speed within the coagulation tank. In consequence, the turbidity aggregates (flocs) start to settle away from the backing medium accumulation layer (although larger flocs than the opening of the lower outflow prevention plate are prevented from further downward settlement by the presence of the outflow prevention plate), and gradually float and are deposited on the lower outflow prevention plate to form the floc blanket.

Furthermore, it has been observed that the formation of the floc blanket is also conspicuous when the dosage level of the coagulant is relatively high in addition to the case of higher turbidity of the raw water.

The present inventors have further discovered that the floc blanket formed on the lower outflow prevention plate has a function of absorbing flocs which have not yet fully grown and which flow from the lower part of the coagulation tank through the lower outflow prevention plate, thereby facilitating the turbidity removal from the raw water.

Furthermore, when the growth of the floc blanket is left as it is so that the floc blanket reaches the packing medium accumulation layer, plenty of coarse and large flocs forming the floc blanket enter the interior of the packing medium accumulation layer, remarkably degrading the coagulation filtration function of the packing medium accumulation layer, and leading to a premature arrival of the time when the packing medium accumulation layer can no longer accept flocs. In other words, if the growth of the floc blanket is left as it is, the function of the packing medium accumulation layer will fall off due to the contact with the floc blanket. As a result, to recover the function of the packing medium accumulation layer, there is frequent need for the cleansing operation of the packing medium accumulation layer, resulting in frequent intervals between cleanings, which in turn reduces the water passage operation time. Accordingly, it has turned out that it is necessary to prevent the floc blanket from reaching the packing medium accumulation layer in order to elongate the cleansing interval of the packing medium accumulation layer in the coagulation tank, that is, to elongate the water passage operation time.

It is the object of the present invention to provide a coagulator capable of elongating the cleaning interval of a packing medium accumulation layer to ensure a long-term stable outflow of high quality treated water.

The coagulator in accordance with the present invention has a coagulation tank through which raw water bearing a coagulant is passed upward to cause suspended solids in the raw water to settle coagulatively, the coagulator comprising a packing medium accumulation layer formed by stacking small packing medium pieces having large void ratios, in the upper portion of the coagulation tank whose interior is horizontally demarcated by two porous partition plates; and a communication device for allowing the interior of the coagulation tank on and in the vicinity of the lower porous partition plate of the coagulation tank to communicate with the exterior of the coagulation tank. Then, upon the passage of raw water, a floc blanket which may be formed in a water flow region between the lower porous partition plate and the packing medium accumulation layer is withdrawn from the vessel interior to the vessel exterior by means of the communication device.

In the packing medium accumulation layer, suspended solids in raw water added with a coagulant grow into larger flocs and settle, part of which remains on the lower porous partition plate, where a floc blanket is formed. This floc blanket captures micro is formed, resulting in an enlargement of the floc blanket. The floc blanket is withdrawn to the exterior of the tank by use of the communication device so that the flocs on and in the vicinity of the lower porous partition plate can be discharged, thereby preventing the amount of flocs within this region from becoming excessive. It is thus possible to prevent the floc blanket from reaching the interior of the contact packing medium accumulation layer and from impeding the full execution of the coagulating treatment.

It is preferable that in order to ensure an effective utilization of the floc absorption and coagulating function of the growing floc blanket, the height of the water flow region formed between the lower porous partition plate and the packing medium accumulation layer should be 20 cm or more, to secure the floc blanket formation region.

Furthermore, at a front part of the packing medium accumulation layer there may be provided a front packing medium accumulation layer through which raw water is passed with a higher superficial water passage velocity than the superficial water passage velocity through the downstream packing medium accumulation layer. Thus, primarily treated water which has passed through the front packing medium accumulation layer is passed through the packing medium accumulation layer, This ensures a more effective formation of the coagulating flocs of the suspended solids.

No restriction is imposed on the coagulant to be dosed to the raw water as long as it has a coagulating effect for the suspended solids in the raw water. The coagulant can preferably be, for example, aluminum salt such as aluminum sulfate and polyaluminum chloride. The optimum dosage level of the coagulant depends on the nature of the coagulant quality of raw water (turbidity, etc.), and hence is previously set to a preferred value by means of experiments or the like.

In the case of using an aluminum based inorganic coagulant, its dosage level, which may vary depending on the turbidity of the raw water, may be in the order of 0.1 to 0.001, preferably 0.05 to 0.005 in ALT (aluminum/turbidity) ratio. By employing this range of ALT ratio, the suspended solids in raw water are so coagulated as to form micro flocs of the suspended solids with dimensions of 100 $\mu$m or less, preferably of the order of several $\mu$m to several tens $\mu$m.

It is also preferable that the coagulation tank is provided with an interface detector which detects the interface between a floc blanket which may be formed on the lower porous partition plate and water lying thereon.

Available as the interface detector are, for example, an interface meter based on optical turbidity measurement to measure the quantity of light transmitted through the floc blanket and the water lying thereon to thereby detect the interface between the floc blanket and water, an interface meter utilizing ultrasonic waves and an interface meter utilizing the viscosity measurement.

It is further preferable that the coagulation tank is provided with an outflow regulator which regulates the outflow of flocs removed from the floc blanket by way of the communication device, in interlock with the interface detector, and that the outflow rate of flocs is regulated by the outflow regulator, in response to the position of interface detected by the interface detector, whereby the interface is kept within a predetermined range (height). By virtue of this, it is possible to securely prevent the floc blanket from coming in contact with the packing medium accumulation layer and to keep the floc blanket at a predetermined thickness to thereby positively utilize the floc absorption and coagulating function of the floc blanket.

The outflow regulator can be, for example, an opening/closing valve and a flow regulating valve in communication with the interface meter. The floc drawoff method can be either an on-off drawoff method in which the valve is opened and closed, or a continuous drawoff method in which the valve opening is regulated so as to keep the interface between the floc blanket and water at a preset height while continuously withdrawing the flocs.

The communication device has no restriction on its construction as long as it allows the interior of the coagulation tank on and near the lower porous partition plate to communicate with the exterior of the tank and is capable of withdrawing the flocs from the floc blanket which may be formed in the water flow region formed between the lower porous partition plate and the packing medium accumulation layer, to the exterior of the tank.

Preferably, the communication device has an opening which extends through the wall of the coagulation tank and opens into the tank interior on and near the lower porous partition plate, with the communication device being in the form of a tubular body having the other end positioned at the exterior of the tank.

Alternatively, the communication device leads into the vessel interior by way of an opening which extends through the tank wall of the coagulation tank and faces the tank interior on and near the lower porous partition plate, with the communication device being in the form of a tank body having an outlet to the exterior of the tank.

The sectional area of the communication device is conveniently within a range of 1 to 20% of the sectional area of the coagulation tank, i.e. with the opening ratio of the communication device being conveniently 1 to 20%.

The raw water capable of being treated by the coagulator of the present invention has no restrictions on its water source and water quality. The present invention is applicable, for example, to raw water with a turbidity of several degrees to 2000 degrees.

As used herein, the raw water means water to be treated which is introduced into the coagulator. In the case of the coagulator for treating not only raw water for city water such as river water, well water and lake and marsh water but also the public sewage and factory waste water, the drainage introduced into the coagulator is referred to as the raw water.

BEST MODE FOR CARRYING OUT THE INVENTION

Exemplary embodiments will be described hereinbelow. Reference is made to the accompanying drawings to describe specifically and in more detail the embodiments of the present invention, which is not intended to be limited to those.

Exemplary Embodiment 1

Figure 1:
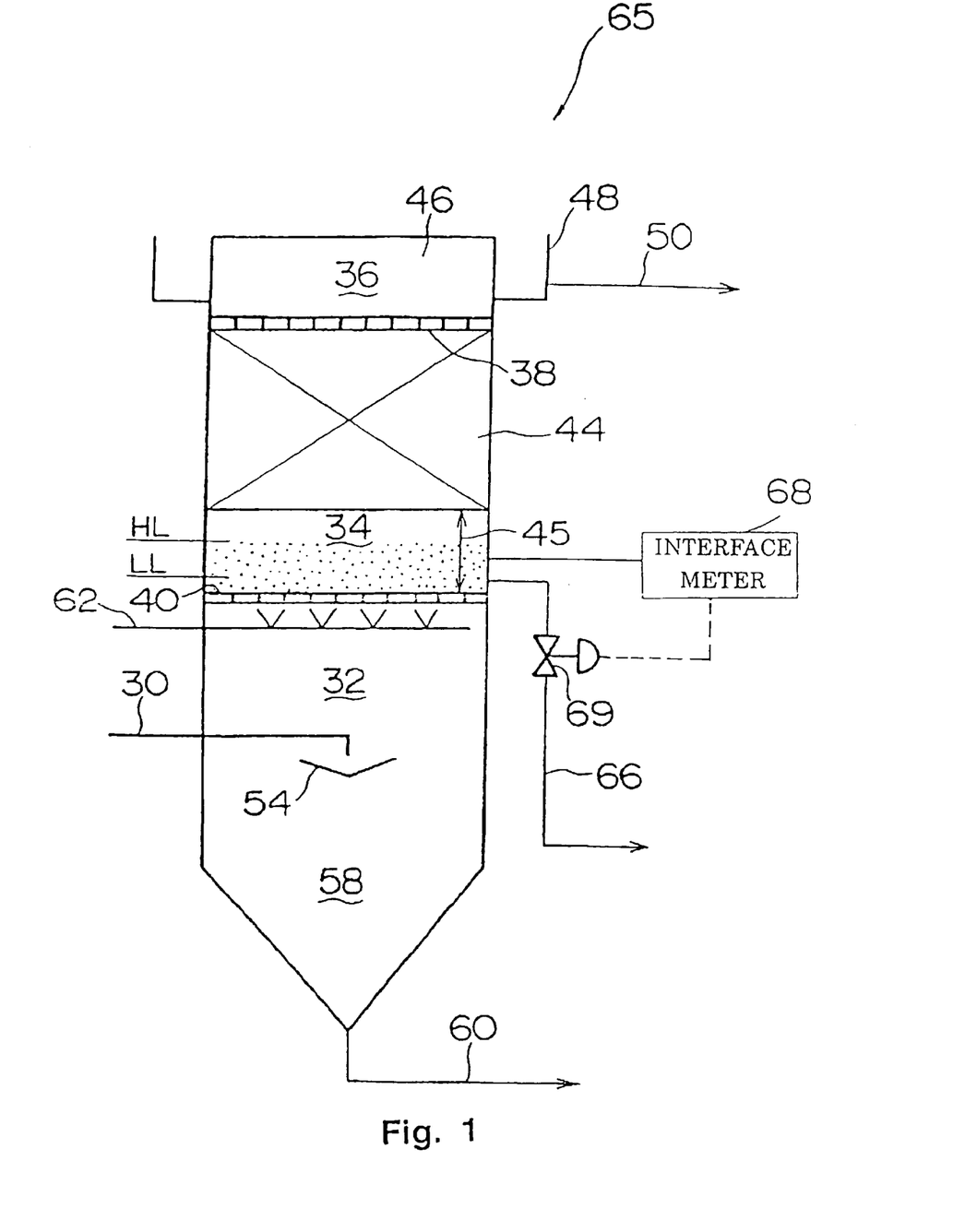
FIG. 1 is a schematic diagram showing the construction of a coagulation tank of a coagulator of an exemplary embodiment 1.

This exemplary embodiment is an example of the embodiment of a coagulator in accordance with the present invention. FIG. 1 is a schematic diagram showing the construction of a principal part, i.e., a coagulation tank, the coagulator of this exemplary embodiment.

The coagulator of this exemplary embodiment is constructed in the same manner as the conventional coagulator shown in FIG. 5 with the exception that the former has the coagulation tank in the form of a coagulation tank 65 equipped with a floc blanket drawoff device.

In addition to the construction of the conventional coagulation tank 20 shown in FIG. 6, the coagulation tank 65 is provided with a floc drawoff pipe 66 acting as a communication device for allowing the interior of the vessel on or in the vicinity of a lower outflow prevention plate 40 of the coagulation tank 65 to communicate with the exterior of the tank. An interface meter is also provided as an interface detector for detecting an interface between the floc blanket and the water. Furthermore, a flow regulating valve 69 is provided as an outflow rate regulator for regulating the outflow of floc flowing through the floc drawoff pipe 66 in interlock with the interface meter 68.

The floc drawoff pipe 66 is a piping which extends through a vessel wall of the coagulation tank 65 and has an opening immediately above the lower outflow prevention plate (porous partition plate) 40, the pipe 66 serving to allow flocs to flow out of the floc blanket formed in the flow water region 45 into a predetermined site.

The interface meter 68 is an interface meter which optically measures the turbidity of the floc blanket and the turbidity of water and detects the interface between the floc blanket and water from the difference in the turbidity. The interface meter 68 issues a signal both when the interface has risen to reach a preset high level HL and when the interface has lowered to reach a low level LL.

Upon the reception of a signal indicative of the arrival of the interface at the high level HL from the interface meter 68, the flow regulating valve 69 opens, allowing the flocs to flow out through the floc drawoff pipe 66. Then, upon the reception of a signal indicative of the arrival of the interface at the low level LL from the interface meter 68, the valve is closed. When the interface meter again issues a signal indicative of the arrival to the high level HL with the rise of the interface, the flow regulating valve 69 opens to allow the flocs to flow out.

In the coagulation tank 65 of this exemplary embodiment, such a interlock between the interface meter 68 and the flow regulating valve 69 allows the interface of the floc blanket to constantly lie between the preset high level HL and low level LL, preventing the floc blanket from coming in contact with the packing medium accumulation layer 44.

It is to be appreciated that the exemplary embodiment 1 may be provided with the interface meter for continuously detecting the position of interface and with the flow regulating valve for regulating the valve opening in interlock with the interface meter to continuously drawoff the flocs so as to keep the interface at the preset level. The same applies to exemplary embodiments 2 and 3 which follow.

Exemplary Embodiment 2

Figure 2:
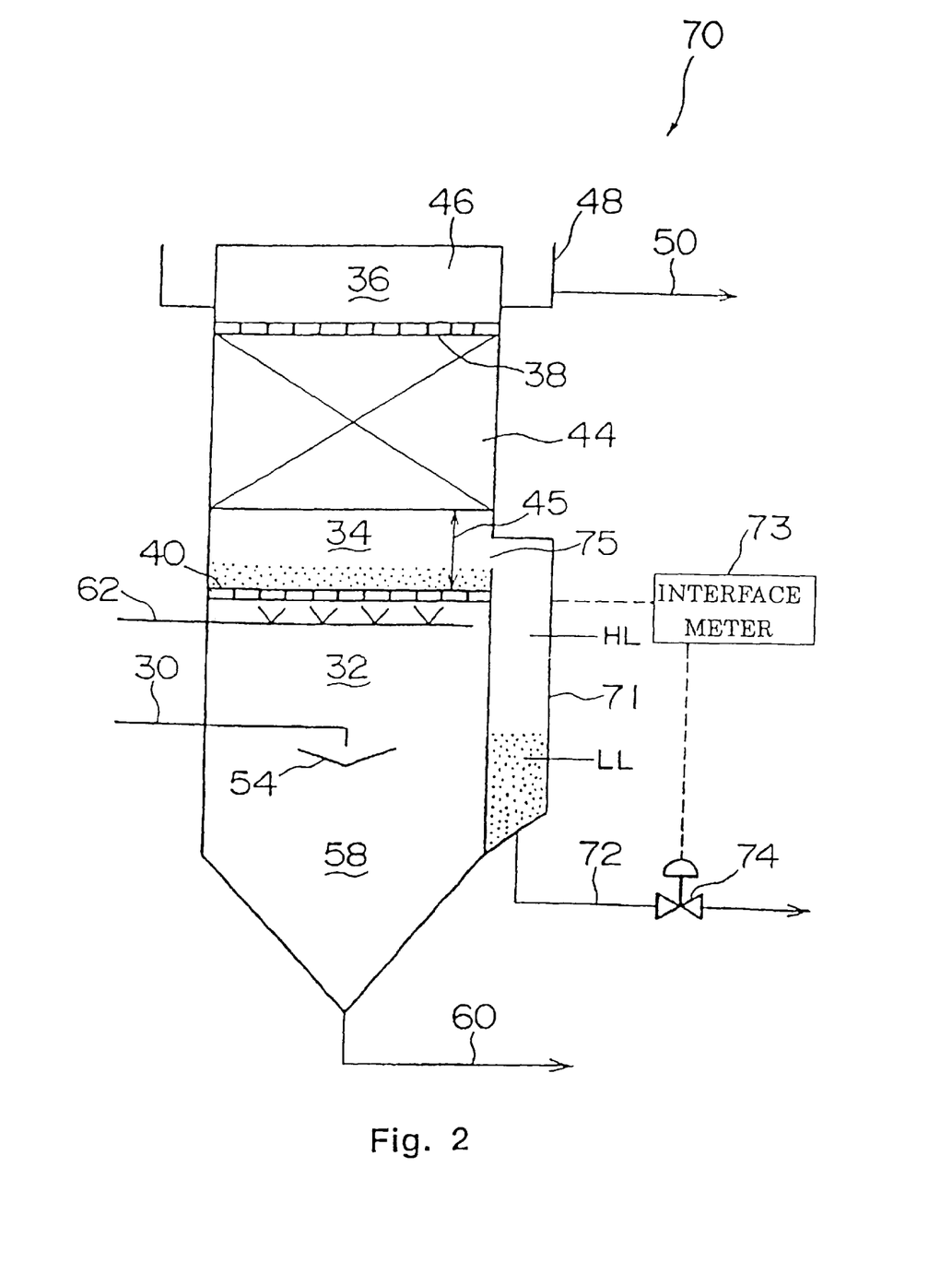
FIG. 2 is a schematic diagram showing the construction of the coagulation tank of the coagulator of an exemplary embodiment 2.

This exemplary embodiment is another example of the embodiment of the coagulator in accordance with the present invention. FIG. 2 is a schematic diagram showing the construction of a principal part, i.e., a coagulation tank, of the coagulator of this exemplary embodiment.

The coagulator of this exemplary embodiment is constructed in the same manner as the conventional coagulator shown in FIG. 5 with the exception that it has the coagulation tank in the form of a coagulation tank 70 equipped with a floc blanket drawoff device.

In addition to the construction of the conventional coagulation tank 20 shown in FIG. 6, the coagulation tank 70 is provided with a jacket 71 and a floc drawoff 72 disposed on the bottom of the jacket 71, which acts as a communication device for allowing the interior of the tank on or in the vicinity of a lower outflow prevention plate (porous partition plate) 40 to communicate with the exterior of the vessel. The coagulation tank 70 is further provided with an interface meter 73 acting as an interface detector for detecting an interface between the floc blanket and water, and with a flow regulating valve 74 acting as an outflow rate regulator for regulating the outflow of floc blanket flowing through the floc drawoff pipe 72 in interlock with the interface meter 73.

The jacket 71 is a double-tank type container provided on the outside of the coagulation tank 70, and extends through a tank wall of the coagulation tank 70. The jacket 71 has an opening 75 immediately above the lower outflow prevention plate 40 and communicates via the opening 75 with the flow water region 45. Thus, when the interface of the floc blanket formed in the flow water region 45 rises and reaches the level of the opening 75, the excess sludge (floc) blanket is allowed to spontaneously flow out and to be drawn off into the jacket 71, so that the interface of the sludge blanket within the coagulation tank 70 is positioned at all times in the vicinity of the opening 75.

The flow drawoff pipe 72 is connected to the bottom of the jacket 71 so as to allow the flocs to flow out to a predetermined site.

The interface meter 73 is an interface meter which optically measures the turbidity of the floc blanket and the turbidity of water and detects the interface between the floc blanket within the jacket 71 and water from the difference in the turbidity. When the interface rises and reaches a preset high level HL or when the interface lowers and reaches a low level LL, the interface meter 73 issues a signal indicative of the respective levels.

Upon the reception of a signal indicative of the arrival of the interface at the high level HL from the interface meter 73, the flow regulating valve 74 opens, allowing the flocs to flow out through the floc jacket 71. Then, upon the reception of signal indicative of the arrival of the interface at the low level LL from the interface meter 73, the valve is closed. When the interface meter 73 again issues a signal indicative of the arrival to the high level HL with the rise of the interface, the flow regulating valve 74 opens to allow the flocs to flow out.

In the coagulation tank 70 of this exemplary embodiment, the interface of the floc blanket within the coagulation tank 70 constantly lies at a predetermined position in the vicinity of the opening 75 and is prevented from reaching the packing medium layer 44.

Exemplary Embodiment 3

Figure 3:
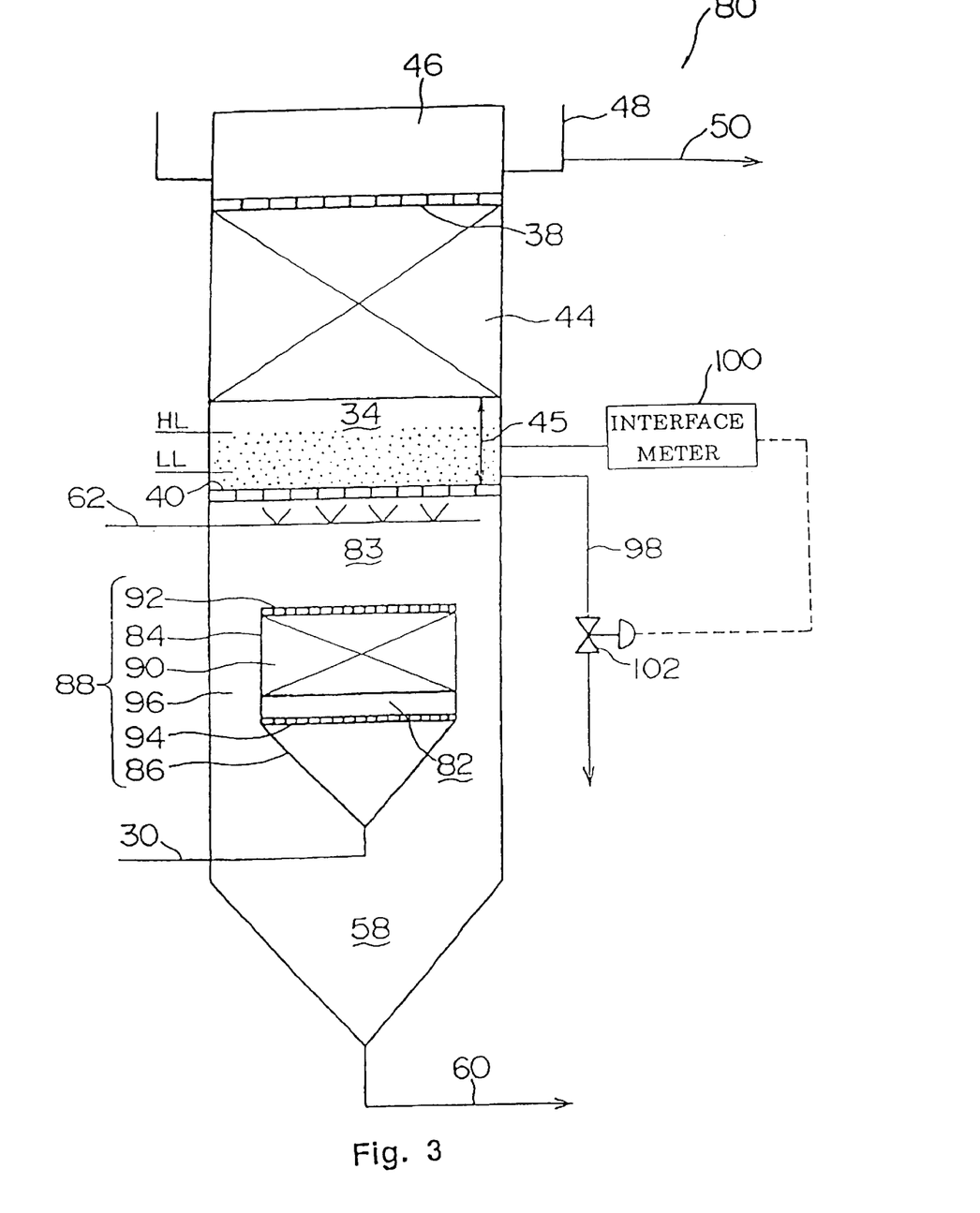
FIG. 3 is a schematic diagram showing the construction of the coagulation tank of the coagulator of an exemplary embodiment 3.

This exemplary embodiment is a yet further example of the embodiment of the coagulator in accordance with the present invention. FIG. 3 is a schematic diagram showing the construction of a principal part, i.e., a coagulation tank, of the coagulator of this exemplary embodiment.

The coagulator of this exemplary embodiment is provided with a improved type coagulation tank 80 of the conventional coagulation tank 20 shown in FIG. 6.

The construction of the improved type coagulation tank 80 will first be described with reference to FIG. 3. The improved coagulation tank 80 of the coagulation tank 20 is a coagulation tank which discharges treated water having a lower turbidity and has a longer cleaning interval of the packing medium accumulation layer compared with the conventional coagulation tank 20. In the improved type coagulation tank 80 as shown in FIG. 3, the construction above the lower outflow prevention plate 40 (including an air supply pipe 62) is the same as the conventional coagulation tank 20, with the difference of construction lying in that a front coagulator is provided in place of a raw water inflow zone 32 between the lower outflow prevention plate 40 of the conventional coagulation tank 20 and a sludge storage zone 58.

The front coagulator provided in place of the raw water inflow zone 32 of the conventional coagulation tank comprises a front packing medium zone 82 and a separation zone 83 in the form of a mere spatial region interposed between the front packing medium zone 82 and the lower outflow prevention plate 40.

The front packing medium zone 82 is formed in an inner container 88 having at its upper portion a cylindrical part 84 and having at its lower portion an inverted conical part 86 continuous with the cylindrical part 84. The cylindrical part 84 accommodates a plurality of pieces of packing medium small contact materials therein, with the upper end portion and the lower end portion of the cylindrical part 84 being provided with perforated outflow prevention plates 92 and 94 so as to prevent the accommodated packing medium from flowing out together with the raw water. With the passage of the raw water, the packing medium is accumulated under the upper outflow prevention plate 92 to form the front packing medium accumulation deposition layer 90.

The inverted conical part 86 connects at its bottom to an inflow pipe 30 for raw water and is provided to introduce uniformly the raw water into the cylindrical part 84.

In the improved coagulation tank 80, setting is made such that superficial water flow velocity through the front packing medium accumulation layer 90 formed in the cylindrical part 84 is larger than the superficial water flow velocity at the packing medium accumulation layer 44 over the lower outflow prevention plate 40. To this end, the diameter of the cylindrical part 84 is smaller than the diameter of the coagulation tank 80.

Also, the packing medium constituting the front packing medium accumulation layer 90 may have the same shape as the packing medium constituting the packing medium accumulation layer 44, but is preferably larger in size although the size can be the same.

The separation zone 83 is a region in which a space having the same diameter as the coagulating vessel 80 is provided to thereby rapidly reduce the flow rate of the primarily treated water flowing out from the front packing medium accumulation layer 90 so that coarsely coagulated flocs entrained by the primarily treated water is hydraulically separated from the primarily treated water.

At the beginning of the start of passage of the raw water, the minute flocs in the raw water flowing into the front packing medium layer 90 are caught by the "blockage" effect of the packing medium in such a manner that they adhere onto the surface of the packing medium and cover the surface.

Once the minute flocs start to adhere to the surface of the packing medium, the subsequent micro flocs not only adhere to the unadhered surface of the packing medium for capture but also collide with the adhered flocs on the packing medium which are themselves adhesive. In this manner, contacts among the micro flocs are advanced more quickly, so that the floc layer on the packing medium gradually grows.

Although due to a relatively strong adhesive force of the micro flocs on the packing medium at the start of the adhesion the micro flocs are not disclosed easily, these micro flocs are dislodged by the sharing force due to the water flow of the raw water when these micro flocs gradually absorbs the following micro flocs and then gradually become coarser. Even the micro flocs which have been dislodged before becoming so coarse, if they has grown to certain level more in size, would be deposited at a site where water flow rate is slow in the packing medium layer 90 or on the rear sides or the internal voids of the packing medium which are not influenced by the water flow.

Accordingly as the capture of the suspended solids in the raw water progresses, a diversity of floc group including micro flocs adhered on the surface of the packing medium and coarse coagulated flocs having a higher settling velocity are retained in the front packing medium accumulation layer 90. Although the voids within the packing medium and interstices between the adjacent packing medium are blocked with the advancement of the deposition of the flocs, the pressure of raw water passing therethrough will cause the deposited floc group to spurt upward.

The spurting phenomenon of the floc group has an effect of fractionating the spurted floc group. That is, the smaller floc particles are raised upward due to the flow rate of the raw water, although once they come in contact with the upper packing medium they settle there. On the other hand, the coarse coagulated flocs remain in the neighborhood of the lower packing medium of raw water against the flow. Thus, with the advancement of the adhesion and growth of the micro flocs, the interior of the packing medium accumulation layer 90 is filled with the coagulated floc group which has become coarse, and in a short time, the coagulated floc group is separated from the packing medium accumulation layer 90, spurting upward from the upper outflow prevention plate 92.

Since the flow rate of the primarily treated water which has been caused to flow out from the packing medium accumulation layer 90 is rapidly reduced in the separation zone 83, the coagulative flocs having coarse particle diameters and larger densities are separated from the flow of the primarily treated water, the majority of which passes through an annular space 96 of the static state between the coagulation tank 80 and the inner container 88 and settles, and then reaches the sludge storage zone 58 and is stored as settled sludge.

Accordingly, during the passage through the front packing medium accumulation layer 90, a large part of the micro flocs formed in the coagulant mixing tank 18 and in the inflow pipe 30 becomes coarse flocs and is settled and separated in the sludge storage zone. As a result of this, the amount of suspended solids in the primarily treated water which has been made to flow in the packing medium layer 44 is significantly reduced. This means that a large part of floes in the primarily treated water are micro flocs.

Due to accelerated superficial velocity within the packing medium accumulation layer 90, the coagulative flocs which has become coarse in the packing medium accumulation layer 90 are from time to time dislodged and entrained by the water flow of the raw water without the need for any mechanical dislodging device.

Accordingly, without any special cleaning operations it is possible to always keep the floc coagulation and adsorption capacity of the packing medium accumulation layer 90 high, with little or no possibility of clogging the packing medium accumulation 90. Furthermore, there is no formation of the floe blanket, and even if it is formed, it would be dispersed by the higher flow velocity of the raw water.

Therefore, in the case of the coagulation tank 80 of this exemplary embodiment as well, the floc blanket will be formed on the outflow prevention plate 40 provided above the separation zone 83 in the same manner as the exemplary embodiments 1 and 2.

Thus, this exemplary embodiment is provided with a floc blanket drawoff device similar to that described in the exemplary embodiment 1.

In order to withdraw the flocs from the floc blanket on the outflow prevention plate 40, the coagulation tank 80 is provided with a floc drawoff pipe 98 serving as a communication device for allowing the interior of the coagulation tank 80 above and in the vicinity of the lower flowout prevention plate 40 of the coagulation tank 80 to communicate with the exterior of the tank, and with an interface meter 100 serving as an interface detector for detecting the interface between the floc blanket and the water, and further with a flow regulating valve 102 serving as an outflow regulator for regulating the outflow of the floes flowing through the floc drawoff pipe 98 in interlock with the interface meter 100.

The floc drawoff pipe 98 is a piping which extends through a vessel wall of the coagulation tank 80 and has an opening immediately above the lower outflow prevention plate 40, the pipe 98 serving to allow the floes to flow out of the floc blanket of the flow water region 45 into a predetermined site.

The interface meter 100 is an interface meter which optically measures the turbidity of the floc blanket and the turbidity of water and detects the interface between the floc blanket and water from the difference in turbidity. Both when the interface rises to reach a preset high level HL and when the interface lowers to reach a low level LL, the interface meter 100 issues signals indicative of the respective levels.

Upon the reception of a signal indicative of the arrival of the interface at the high level HL from the interface meter 100, the flow regulating valve 102 opens, allowing the flocs to flow out through the floc drawoff pipe 98. Then, upon the reception of a signal indicative of the arrival of the interface at the low level LL from the interface meter 100, the valve is closed. When the interface meter 100 again issues a signal indicative of the arrival to the high level HL as a result of the rise of the interface, the flow regulating valve 102 opens to allow the flocs to flow out.

In the coagulation tank 80 of this exemplary embodiment, such a cooperation of the interface meter 100 and the flow regulating valve 102 allows the interface of the floc blanket to constantly lie between the preset high level HL and low level LL, preventing it from reaching the packing medium accumulation layer 44.

It is to be noted that this exemplary embodiment may be provided with the floc drawoff device having the jacket in the same manner as the exemplary embodiment 2.

In the above exemplary embodiments 1 to 3, the flocs which have been caused to flow into the packing medium accumulation layer 44 come into contact with the packing medium and are captured on the surface and in the voids in the interior of the packing medium, and interstices between the packing medium. Part of the flocs which have been captured by the packing medium absorbs micro flocs which have subsequently flowed in, and grow into larger flocs.

When the flocs grow to a size having a settlement velocity higher than the water passage velocity in the packing medium accumulation layer 44, e.g., 100 to 1000 m/day, they starts to settle. However, if the opening of the lower outflow prevention plate 40 is 2 mm for example, then flocs larger than 2 mm are prevented from settling further down through the lower outflow prevention plate 40, and float and are gradually deposited on the lower outflow prevention plate 40.

The floc layer which has been deposited on the lower outflow prevention plate 40 results in a floc blanket when it reaches a certain thickness. Micro flocs which have newly flowed in from the separation zone 83 through the lower outflow prevention plate 40 collide with the floc blanket and are absorbed thereby, resulting in growth of the floc blanket.

As a result, very little micro flocs are allowed to reach the packing medium accumulation layer 44, elongating the time taken to reach the limit of the turbidity capture capacity of the packing medium accumulation layer 44, although continuation of feed of the raw water into the coagulation tank 80 will allow the floc blanket to grow on the lower outflow invention plate 40 to increase its thickness, reaching the packing medium accumulation layer 44 sooner or later.

Thus, in the exemplary embodiments 1 to 3, excess flocs are drawn off from the floc blanket by use of the floc drawoff device in order to ensure that the floc blanket cannot reach the packing medium accumulation layer 44.

Although the dimensions of the floc drawoff device for the floc blanket differ depending on the water quality of raw water or water passage velocity, the sectional areas of the floc drawoff pipes 66, 72 and 98 are ordinarily in the order of 5% of the sectional areas of the coagulation tanks 65, 70 and 80. Also, the connection of the floc drawoff pipes 66 and 98 are made at positions in the range of 15 to 50 cm above the lower outflow prevention plate 40. The opening 75 of the jacket 71 is formed such that the weir height lies in the range of 15 to 50 cm, with the opening area of the opening 75 being of the order of 5% of the sectional area of the coagulation tank 70.

The floc drawoff pipes 66, 72 and 98 may have free destinations, and they may be connected to a sludge discharge pipe 60 for example.

The conventional coagulation tank 20 having no floc drawoff device for the floc blanket needs a longer time for the gravity settlement concentration of the flocs (sludge) deposited on the lower outflow prevention plate 40, since the flocs are air stirred by air supplied by the blower 64 upon cleaning together with the turbidity deposited on the packing medium accumulation layer 44 and is discharged by the sludge discharge pipe 60 with the state of mixture with the water having a lower turbidity concentration.

In the coagulating vessel of the exemplary embodiments 1 to 3, on the other hand, the flocs which are discharged from the floc drawoff device for the floc blanket has a higher settlement velocity than the water passage velocity of the coagulating vessel, e.g., 100 to 1000 m/day, so that significantly improved concentration properties in the gravity settlement concentration are achieved to result in easier sludge treatment.

Experimental Example

The following experiment was carried out to evaluate the effects of the coagulator of the exemplary embodiment 3. First, the exemplary embodiment experimental apparatus having the following dimensions was prepared with the same construction as the coagulator of the exemplary embodiment equipped with the coagulation tank, while conventional example experimental apparatus was prepared with the same construction as the conventional example coagulator which is provided with the coagulation tank having the same construction as the coagulation tank 80 with the exception that it is not provided with the floc drawoff pipe 98, the interface meter 100 and the flow regulating valve 102.

Specifications of Experimental Apparatus

| coagulant mixing tank 18 | |
| --- | --- |
| dimensions | made of polyethylene with 1m3 capacity |
| stirrer | 0.4 kw × 1450 rpm |
| coagulation tank 80 | |
| dimensions | 1,600 mm dia. × 5,100 mm high |
| material of body | SUS 304 |
| front packing medium accumulation layer 90 | |
| dimensions of cylindrical part | 1,100 mm dia. × 500 mm high |
| packing medium | cylindrical body of 10 mm dia. × 10 mm long made of polypropylene of 0.97 specific gravity |
| downstream packing medium accumulation layer 44 | |
| packing medium | 4 mm dia. × 10 mm long cylindrical body made of polypropylene of 0.97 specific gravity |
| lower outflow prevention plate 40 | 2 mm in openings, stainless steel made |
| floc drawoff pipe 98 | 250 mm dia. × 2 pcs. opening ratio = 4.9% |
| interface meter 100 | transmitted light method |

Using the prepared exemplary embodiment experimental apparatus and conventional example experimental apparatus, test operations were carried out under the following treatment conditions. Note that this experimental example was an example of the case where the water for city water was produced.

| | Treatment Conditions |
| --- | --- |
| raw water quality | average SS = 300 mg/litter |
| flow rate of raw water | 410 m3/day |
| raw water velocity | 8.5 m/hr |
| coagulant | polyaluminum chloride (PAC) PAC dosage level = SS × 0.5 mg/litter | target quality of treated water: treated water is to be utilized as city water; SS = 5 mg/litter or less In the raw water treatment test in accordance with the exemplary embodiment experimental apparatus, the experimental results shown in the graph (1) of FIG. 4 were obtained. This experimental results revealed that the treated water of SS 5 mg/liter or less was obtained for about 500 min. of operation time.

Figure 4:
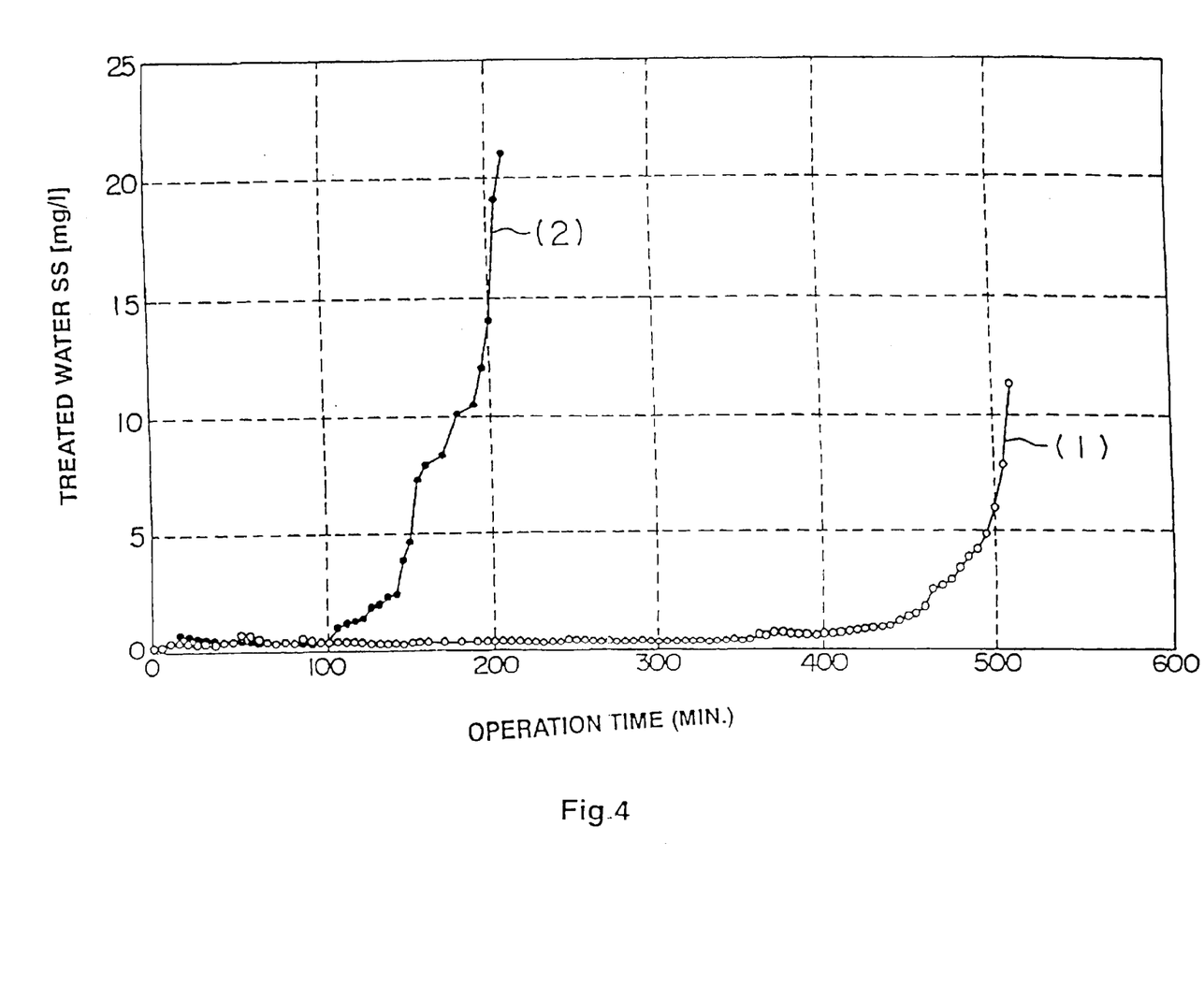
FIG. 4 is a graphic representation showing the result of an experimental example.

In the raw water treatment test in accordance with the conventional example experimental apparatus on the other hand, experimental results shown in graph (2) of FIG. 4 were obtained. This experimental results revealed that the SS concentration of treated water became SS 5 mg/liter or more after the elapse of about 150 min. in operation time.

As can be seen from these experimental results, the coagulator of this exemplary embodiment ensures a stable outflow of high quality treated water over a much longer period of time when compared with the conventional coagulator.

According to the present invention, the communication device is provided which allows the interior of the vessel on or in the vicinity of the porous partition plate of the coagulation tank to communicate with the exterior of the tank, whereby the floc blanket which may be formed in the water flow region between the lower porous partition plate and the packing medium accumulation layer is drawoff via the communication device from the tank interior to the tank exterior during the water passage of the raw water, thereby elongating the cleaning intervals of the packing medium accumulation layer, and at the same time ensuring a stable outflow of the high quality treated water over a longer period of time.

[Industrial Applicability]

A coagulator of the present invention is utilized as a water treatment apparatus for use in, e.g., the cases where raw water such as river water is treated to produce city water or industrial water or where waste water such as public sewage and factory waste water is treated to meet regulatory limits.

What is claimed is:

1. A coagulator comprising:
   a. a means for adding a coagulant and
   b. a coagulation tank receiving raw water bearing said coagulant and which coagulates suspended solids in the raw water, said coagulation tank comprising:
      i. an upper tank portion horizontally partitioned by a lower porous partition plate and an upper porous partition plate, and including a first packing medium accumulation layer comprising accumulated packing media disposed between said plates, said accumulated packing media having a predetermined void volume;
      ii. a communication device for allowing the interior of the upper tank portion to communicate with an exterior of the coagulation tank and adapted to draw off flocs which have accumulated above said lower partition plate;
      iii. a second packing medium accumulation layer disposed in a lower tank portion beneath said upper tank portion and comprising packing media having a predetermined void volume through which the raw water bearing a coagulant is passed at a superficial water passage velocity higher than a superficial water passage velocity within the first packing medium accumulation layer;
      iv. a separation zone in the form of a spatial region interposed between the second packing medium accumulation layer and said lower porous partition plate; and
      v. a sedimentation part having a sedimentation zone and residence zone, said zones provided below the second packing medium accumulation layer in said lower tank portion, wherein raw water bearing said coagulant is allowed to flow upwardly through the second packing medium accumulation layer to coagulate and settle the suspended solids in the water, whereby sediment is settled in the sedimentation and residence zones, and whereby the raw water which has passed through the second packing medium accumulation layer then flows through the first packing medium accumulation layer.

2. The coagulator of claim 1, further comprising:
   an interface detector which detects the interface between any floc blanket which may be formed over said lower porous partition plate and water lying thereon; and
   an outflow regulator which regulates the outflow of flocs drawn off from said floc blanket by way of said communication device, in interlock with said interface detector, wherein the outflow rate of flocs is regulated by said interface detector and the interface is kept within a predetermined range.

3. A coagulator according to claim 2, wherein said communication device is provided with an opening which extends through a wall of said coagulation tank to open into the tank interior on and in the vicinity of said lower porous partition plate.

4. A coagulator according to claim 2, wherein said communication device communicates with the tank interior by way of an opening which extends through the coagulation tank wall to open into the tank interior on and in the vicinity of said lower porous partition plate, said communication device being in a form of a tank body having an outlet to the exterior of said coagulation tank.

5. A coagulator according to claim 1, further comprising an interface detector which detects an interface between any floc blanket which may be formed over said lower porous partition plate and water lying thereon.

6. A coagulator according to claim 5, further comprising an outflow regulator which regulates an outflow of flocs drawn off from said floc blanket by way of said communication device in interlock with said interface detector, and wherein an outflow rate of flocs is regulated by said outflow regulator in response to a position of interface detected by said interface detector, whereby the interface is kept within a predetermined range.

7. A coagulator according to claim 6, wherein said communication device is provided with an opening which extends through a wall of said coagulation tank to open into the tank interior on and in the vicinity of said lower porous partition plate.

8. A coagulator according to claim 6, wherein said communication device communicates with the tank interior or by way of an opening which extends through the coagulation tank wall to open into the tank interior on and in the vicinity of said lower porous partition plate, said communication device being in a form of a tank body having an outlet to the exterior of said coagulation tank.

9. A coagulator according to claim 5, wherein said communication device is provided with an opening which extends through a wall of said coagulation tank to open into the tank interior on and in the vicinity of said lower porous partition plate.

10. A coagulator according to claim 5, wherein said communication device communicates with the tank interior by way of an opening which extends through the coagulation tank wall to open into the tank interior on and in the vicinity of said lower porous partition plate, said communication device being in a form of a tank body having an outlet to the exterior of said coagulation tank.

11. A coagulator according to claim 1, wherein said communication device is provided with an opening which extends through a wall of said coagulation tank to open into the tank interior on and in the vicinity of said lower porous partition plate.

12. A coagulator according to claim 1, wherein said communication device communicates with the tank interior by way of an opening which extends through the coagulation tank wall to open into the tank interior on and in the vicinity of said lower porous partition plate, said communication device being in a form of a tank body having an outlet to the exterior of said coagulation tank.

13. The coagulator of claim 2, wherein a sectional area of the communication device is 1% to 20% of the sectional area of the second coagulation tank.

14. The coagulator of claim 2, wherein the first coagulation tank has an inverted conical shape through which the raw water enters.

* * * * *